United States Patent
Hori et al.

(10) Patent No.: US 10,370,468 B2
(45) Date of Patent: Aug. 6, 2019

(54) SAPONIFIED ETHYLENE-VINYL ESTER-BASED COPOLYMER PELLET AND PRODUCING METHOD THEREFOR

(71) Applicant: THE NIPPON SYNTHETIC CHEMICAL INDUSTRY CO., LTD., Osaka (JP)

(72) Inventors: Shinichi Hori, Osaka (JP); Nobuyuki Yamamoto, Osaka (JP); Takuya Nakajima, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/761,641

(22) PCT Filed: Oct. 11, 2016

(86) PCT No.: PCT/JP2016/080059
§ 371 (c)(1),
(2) Date: Mar. 20, 2018

(87) PCT Pub. No.: WO2017/073307
PCT Pub. Date: May 4, 2017

(65) Prior Publication Data
US 2018/0346620 A1    Dec. 6, 2018

(30) Foreign Application Priority Data
Oct. 28, 2015 (JP) .................. 2015-211442

(51) Int. Cl.
*C08F 210/02* (2006.01)
*B29B 9/16* (2006.01)
*C08L 29/04* (2006.01)
*B29K 23/00* (2006.01)

(52) U.S. Cl.
CPC .............. *C08F 210/02* (2013.01); *B29B 9/16* (2013.01); *C08L 29/04* (2013.01); *B29B 2009/163* (2013.01); *B29K 2023/086* (2013.01)

(58) Field of Classification Search
CPC ..... B29K 2023/086; C08J 3/12; C08J 9/0047; C08L 29/04
See application file for complete search history.

(56) References Cited

U.S. PATENT DOCUMENTS

| | | | |
|---|---|---|---|
| 2002/0028871 A1* | 3/2002 | Kawahara | C08F 6/10 524/524 |
| 2004/0082690 A1* | 4/2004 | Kawahara | B29B 9/06 524/127 |
| 2012/0237747 A1* | 9/2012 | Tai | B32B 27/08 428/216 |
| 2013/0018133 A1 | 1/2013 | Yamasaki et al. | |
| 2014/0213701 A1 | 7/2014 | Nonaka et al. | |

FOREIGN PATENT DOCUMENTS

| | | |
|---|---|---|
| CN | 106146718 A * | 11/2016 |
| EP | 2 554 372 A1 | 2/2013 |
| JP | S62-3866 B2 | 1/1987 |
| JP | H03-11270 B2 | 2/1991 |
| JP | 2000-044756 A | 2/2000 |

OTHER PUBLICATIONS

International Search Report for PCT/JP2016/080059, dated Jan. 17, 2017.
ESR for EP App No. 16859544.5 dated Mar. 15, 2019.

* cited by examiner

*Primary Examiner* — Mark S Kaucher
(74) *Attorney, Agent, or Firm* — Greenblum & Bernstein, P.L.C.

(57) ABSTRACT

Provided is EVOH resin pellet capable of suppressing the occurrence of fish eye even in a resultant monolayer film, and the method for producing the same. The EVOH resin pellet contains a boron compound and the boron amount in a surface portion of the pellet is 1.7 ppm or less. After the EVOH resin pellet is made to contain the boron compound, the EVOH resin pellet is rinsed with a mixture of water and alcohol so that the amount of the boron compound in a surface portion can be reduced.

7 Claims, No Drawings

SAPONIFIED ETHYLENE-VINYL ESTER-BASED COPOLYMER PELLET AND PRODUCING METHOD THEREFOR

TECHNICAL FIELD

The present invention relates to saponified ethylene-vinyl ester-based copolymer (hereinafter, referred to as "EVOH resin") pellets which can provide a film with reduced occurrence of fish eye, in particular, relates to EVOH resin pellets wherein an amount of a boron compound in a surface portion per pellet is adjusted, and a producing method for the pellet.

BACKGROUND ART

EVOH resin can exhibit superior excellent gas-barrier performance such as oxygen-barrier performance due to the fact that hydrogen bond is formed between hydroxyl groups in the molecular chain of the EVOH resin to form a crystal which can prevent oxygen from intruding. For this gas barrier performance, EVOH resin is shaped into a film or sheet used as a wrapping material for food, pharmaceuticals, industrial medicine and agrochemicals, or container such as bottle.

In general, shaping EVOH resin into film, sheet, bottle, cup, tube, or pipe is performed by melt-molding. The resulting molded article is processed for actual use. Therefore moldability and processability are important properties for EVOH resin.

A patent document 1 discloses that melt-molding a composition having an increased melt viscosity is advantageous among compositions comprising a boric acid or a salt thereof in film formability of melt-moldable vinyl alcohol-based copolymer such as EVOH resin-based copolymer, in particular, prevention of surging in film forming process.

A patent document 2 discloses that EVOH resin treated with use of a boron compound is extruded with polyolefin to provide a layered film exhibiting an excellent adhesiveness between the EVOH resin layer and the polyolefin layer. The layered film can provide a wrapping material preferably usable in the field that gas barrier performance is required.

According to the patent document 2, the treatment with use of a boron compound may be conducted by adding the boron compound to EVOH resin solution or dispersion. The obtained EVOH resin pellet contains the boron compound and uses as a raw material for extrusion molding.

Recently the appearance of a wrapping material becomes important, therefore EVOH resin film or multilayer structure needs to be reduced in minute fish eye having a size less than 0.1 mm.

A patent document 3 discloses that a boron-containing EVOH resin pellet obtained by a process of permitting a boron compound to be contained in an EVOH resin pellet has a relation between the water amount contained in the pellet and the occurrence of minute fish eye having a size less than 0.1 mm. Also the patent document 3 discloses that the number of minute fish eyes can be dried until the water amount is reduced to 0.0001 to 2% based on the weight of the pellet and contacting the pellet with water.

According to examples of the patent document 3, a 3-type 5-layer film was produced with use of EVOH resin pellet in which the content of water and the content of boron were adjusted. The EVOH resin pellet contains water in an amount of 0.13 to 0.4%, and boron in an amount of 0.015 to 0.039 parts relative to 100 parts of EVOH resin, i.e. 150 to 390 ppm. Such EVOH resin pellet was produced by immersing in water the EVOH resin pellet containing a boron compound and drying it. Thus obtained EVOH resin pellet was fed to a multilayer type extruder to produce a 3-type 5-layer film as shown in Examples 1, 3, and 4. Evaluation of the occurrence of fish eye in the multilayered film was conducted by visually observing and counting minute fish eye having a diameter of 0.01 to 0.1 mm (see paragraphs 0038-0041).

Patent document 1: JP S62-3866B
Patent document 2: JP H3-11270B
Patent document 3: JP2000-44756A

DETAILED DESCRIPTION

Technical Problem to be Solved

In recent years, a superior appearance of a wrapping material is increasingly demanded, and therefore required is suppression of the occurrence of fish eye with securing necessary melt-molding property including prevention of surging in molding process. In the case of producing a monolayer film from EVOH resin, larger fish eyes or more fish eyes may readily appear, compared to the case of the production of a multilayer structure. For this reason, there is a demand for an EVOH resin pellet capable of providing a monolayer film in which the occurrence of fish eye is suppressed.

Under these situations, the present invention has been made. The object of the invention is to provide EVOH resin pellets suppressing the occurrence of fish eye even when a monolayer film is produced from the EVOH resin pellets. Also the object of the invention is to provide a method for producing the pellet.

Means for Solving the Problems

The present inventors have been studied about the relationship between the EVOH resin pellet containing boron compound and the occurrence of fish eye, and have concluded that the fish eye might be caused from the local increase of the viscosity of the EVOH resin due to agglomeration of a boron compound. In the case of the production of monolayer film, the boron compound contained in a surface portion of the pellet would readily agglomerate because the surface more often contacts a metal as a constituent of the molding apparatus. As a result, fish eye would readily appear and be outstanding in the monolayer film. In accordance with their conclusion, they have focused on the amount of boron compound contained in a surface portion of the EVOH resin pellet, and found the fact that decreasing the amount of the boron compound contained in a surface portion of the pellet could reduce number of fish eyes as compared with that of a conventional pellet, and then accomplished the invention.

The inventive pellet exhibits excellent moldability even when shaping into a monolayer film and producing a monolayer film with excellent appearance. A plurality of the pellets may be applied to a production of a multilayered structure comprising other resin layers for improving water resistance, strength and so on. Thus produced multilayered structure would also exhibit excellent moldability and appearance.

The saponified ethylene-vinyl ester-based copolymer pellets of the disclosure comprises saponified ethylene-vinyl ester-based copolymer pellets containing a boron compound (hereinafter sometimes simply called "boron-containing EVOH resin pellet") wherein an amount of boron contained in a surface portion of the pellets containing the boron compound is 1.7 ppm or less per pellet.

Preferably a total amount of the boron in boron-containing EVOH resin pellet is from 10 to 1000 ppm.

Also it is preferred that a weight ratio of the boron contained in a surface portion to the total amount of boron, i.e. boron amount in surface portion/total amount of boron, is $1.38 \times 10^{-2}$ or less.

It is also preferred that the boron-containing EVOH resin pellet further comprises water in an amount of 0.01 to 1% by weight based on a total weight of the pellet.

The producing method of the EVOH resin pellet of the invention is not particularly limited, but a preferable method for producing the EVOH resin pellet comprises contacting a saponified ethylene-vinyl ester-based copolymer pellet containing a boron compound with a mixture of water and alcohol having a weight ratio of water to alcohol of 80/20 to 0/100, thereby adjusting an amount of the boron compound in a surface portion of the pellet to 1.7 ppm or less.

In a preferable aspect of the method, the saponified ethylene-vinyl ester-based copolymer pellet containing a boron compound is a porous pellet obtained by contacting a saponified ethylene-vinyl ester-based copolymer pellet with an aqueous solution of the boron compound and thereafter drying the same.

In this specification, the measurement value of an amount of boron in a saponified ethylene-vinyl ester-based copolymer pellet containing a boron compound is called as "contained amount of boron compound (in terms of boron)" or simply called as "contained amount of boron".

Effect of the Invention

The EVOH resin pellets used in the invention is adjusted to a specific range of the amount of boron compound contained in the whole pellet while at the same time being adjusted to a reduced amount of boron contained in a surface portion per pellet. Therefore the EVOH resin pellet can secure a melt-molding property and reduce the occurrence of fish eye of the molded article therefrom.

MODE FOR CARRYING OUT OF THE INVENTION

Hereinafter, the present invention will be described, however the description shows merely one preferable embodiment and does not restrict the content of the invention.

Saponified ethylene-vinyl ester-based copolymer pellets of the invention comprises saponified ethylene-vinyl ester-based copolymer pellets containing a boron compound wherein the amount of boron contained in a surface portion of the boron-containing EVOH resin pellets is 1.7 ppm or less per pellet. The EVOH pellet containing a boron compound is called "boron-containing EVOH resin pellet".

The term "amount of boron contained in a surface portion of the pellet" means the amount of boron based on the amount of the boron compound contained in a nearly surface of the boron-containing EVOH resin pellet and is distinguishable from the total amount of boron compound contained in the whole of the boron-containing EVOH resin pellet (which is called as "total amount of boron in the pellet").

The boron compound contained in a nearly surface of the pellet includes one attached to the surface of pellet, one bled over the surface and so on. The boron amount contained in a surface portion of the pellet is determined by, for example, measuring the solution obtained by dipping 4 g of boron-containing EVOH resin pellet in 20 ml of methanol at 30° C. for 6 hours with an inductively coupled plasma mass spectrometer (ICP-MS).

[EVOH Resin and Production of Pellet]

(1) EVOH Resin

EVOH resin pellet employed for the disclosure is formed from EVOH resin, which is a water-insoluble thermoplastic resin and usually produced by saponifying a copolymer of ethylene and vinyl ester-based monomer, so-called ethylene-vinyl ester-based copolymer.

Copolymerization of ethylene and vinyl ester-based monomer may be conducted by a known polymerization method including solution polymerization, suspension polymerization, and emulsion polymerization. In general, solution polymerization using a lower alcohol such as methanol (particularly methanol) as a solvent is preferably employed. Saponification of the ethylene-vinyl ester-based copolymer may be conducted by a known method.

Thus produced EVOH resin contains ethylene-derived structural unit and vinyl alcohol structural unit both of which are main structural units, and a slight amount of vinyl ester structural unit which remains as an unsaponified unit.

Vinyl acetate is employed as a typical vinyl ester-based monomer from the viewpoint of commercial availability and efficiency of removing impurities generated in production. Employed may be other vinyl ester-based monomer, for example, aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, as well as aromatic vinyl esters such as vinyl benzoate. Commonly used is an aliphatic vinyl ester having from usually 3 to 20 carbon atoms, preferably 4 to 10 carbon atoms, particularly preferably 4 to 7 carbon atoms. These vinyl ester-based monomers may be used individually or in a combination thereof according to needs.

Ethylene as well as the above-mentioned vinyl ester-based monomer may be commonly obtained from a raw material derived from petroleum such as naphtha. Raw materials derived from natural gas such as shale gas, raw material derived from plants such as sugar or starch contained in sugar cane, sugar beet, corn, and potato, and defecated material derived from cellulose contained in rice, wheat, millet and other plant may be used as a raw material for those monomers.

The content of ethylene-derived unit in the EVOH resin is in the range of usually 20 to 60 mol %, preferably 25 to 50 mol %, particularly preferably 25 to 35 mol %, as a measurement value in accordance with ISO14663. If the ethylene-derived unit content is unduly low, the gas-barrier performance under a high humidity condition and melt-molding property tends to be lowered. If the ethylene-derived unit content is unduly high, insufficient gas-barrier performance might be imparted.

The saponification degree of the vinyl ester component in the EVOH resin is in the range of usually 90 to 100 mol %, preferably 95 to 100 mol %, particularly preferably 99 to 100 mol %, as a measurement value in accordance with JIS K6726 with the proviso that EVOH resin is dissolved homogenously in a mixed solvent of water and methanol. If the saponification degree is unduly low, the gas-barrier performance, thermostability, and humidity resistance tend to be lowered.

Melt flow rate (MFR) of the EVOH resin at 210° C. under a load of 2,160 g is usually from 0.5 to 100 g/10 min., preferably from 1 to 50 g/10 min., particularly preferably from 3 to 35 g/10 min. If the EVOH resin has unduly high MFR, the EVOH resin tends to become unstable in film production. If the EVOH resin has unduly low MFR, the EVOH resin tends to have difficulty in melt-extruding due to relatively high viscosity.

The EVOH resin used in the disclosure may further contain a structural unit derived from the following comonomer in the range not inhibiting the effect of the invention, for example 10 mol % or less.

Examples of the comonomer include olefins such as propylene, 1-butene and isobutene; hydroxy group-containing α-olefins such as 3-buten-1-ol, 3-butene-1,2-diol, 4-penten-1-ol, and 5-hexene-1,2-diol, or a derivative such as ester thereof and acylated product; unsaturated acids such as acrylic acid, methacrylic acid, crotonic acid, phthalic acid (or anhydride), maleic acid (or anhydride), itaconic acid (or anhydride) or salt thereof, or mono- or di-alkyl ester having from 1 to 18 carbon atoms in the alkyl group; acrylamides such as acrylamide, N-alkylacrylamide having from 1 to 18 carbon atoms in the alkyl group, N,N-dimethylacrylamide, 2-acrylamide propanesulfonic acid or salt thereof, and acrylamide propyl dimethylamine or salt thereof or quaternary salt thereof; methacrylamides such as methacrylamide, N-alkylmethacrylamide having from 1 to 18 carbon atoms in the alkyl group, N,N-dimethylmethacrylamide, 2-methacrylamide propanesulfonic acid or salt thereof, and methacrylamide propyl dimethylamine or salt thereof or quaternary salt thereof; N-vinylamides such as N-vinylpyrrolidone, N-vinylformamide, and N-vinylacetamide; vinyl cyanides such as acrylonitrile and methacrylonitrile; vinyl ethers such as alkyl vinyl ether, hydroxyalkyl vinyl ether, and alkoxyalkylvinyl ether having from 1 to 18 carbon atoms in respective alkyl group; vinyl halides such as vinyl chloride, vinylidene chloride, vinyl fluoride, vinylidene fluoride, and vinyl bromide; vinylsilanes such as trimethoxyvinylsilane; allyl halides such as allyl acetate and allyl chloride; allyl alcohols such as allyl alcohol, and dimethoxy allyl alcohol; trimethyl-(3-acrylamide-3-dimethylpropyl)-ammonium chloride, acrylamide-2-methylpropanesulfonic acid and so on.

In addition, a post-modified EVOH resin by urethanation, acetalization, cyanoethylation, or oxyalkylenation may be used.

An EVOH resin obtained by copolymerizing hydroxy group-containing α-olefins is preferred from the viewpoint of secondary moldability. In particular, EVOH resin having a primary hydroxyl group, especially EVOH resin having 1,2-diol in a side chain thereof.

The EVOH resin having 1,2-diol in a side chain thereof contains 1,2-diol structural unit in a side chain as shown in the structural unit (1) below.

[formula 1]

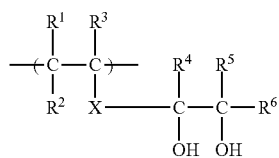

In the formula (1), $R^1$, $R^2$, and $R^3$ represent hydrogen atom or an organic group independently, and X represents single bond or a binding chain, and $R^4$, $R^5$, and $R^6$ represent hydrogen atom or an organic group independently.

Non-limiting examples of the organic group in the 1,2-diol structural unit of the formula (1) include saturated hydrocarbon group such as methyl, ethyl, n-propyl, isopropyl, n-butyl, isobutyl, and tert-butyl; aromatic hydrocarbon group such as phenyl and benzyl group; halogen, hydroxyl, acyloxy, alkoxycarbonyl, carboxyl, sulfonic acid group, and so on.

$R^1$ to $R^3$ each is a saturated hydrocarbon group having from usually 1 to 30 carbon atoms, preferably 1 to 15 carbon atoms, more preferably 1 to 4 carbon atoms, or hydrogen atom. Of these, hydrogen atom is most preferred. $R^4$ to $R^6$ each is an alkyl group having from usually 1 to 30 carbon atoms, preferably 1 to 15 carbon atoms, further preferably 1 to 4 carbon atoms, or hydrogen atom. Of these, hydrogen atom is most preferred. In particular, it is most preferred that all of $R^1$ to $R^6$ are hydrogens.

X in the structural unit of the formula (1) is typically single bond.

X may be a binding chain unless the effect of the disclosure is inhibited. Non-limiting examples of the binding chain include hydrocarbon chain such as alkylene, alkenylene, alkynylene, phenylene, and naphthylene (wherein at least one hydrogen atom of these hydrocarbons may be substituted with halogen such as fluorine, chlorine, or bromine), as well as ether bond-containing group such as —O—, —(CH$_2$O)m-, —(OCH$_2$)m-, and —(CH$_2$O)mCH$_2$-; carbonyl group-containing chain such as —CO—, —COCO—, —CO(CH$_2$)mCO—, and —CO(C$_6$H$_4$)CO—; sulfur atom-containing group such as —S—, —CS—, —SO—, and —SO$_2$—; nitrogen atom-containing group such as —NR—, —CONR—, —NRCO—, —CSNR—, —NRCS—, and —NRNR—; hetero such as phosphorus atom-containing group such as —HPO$_4$—; silicon atom-containing group such as —Si(OR)$_2$—, —OSi(OR)$_2$—, and —OSi(OR)$_2$O—; titanium atom-containing group such as —Ti(OR)$_2$—, —OTi(OR)$_2$—, and —OTi(OR)$_2$O—; aluminum-containing group such as —Al(OR)—, —OAl(OR)—, and —OAl(OR)O—, wherein R is independently a substituting group, and preferably hydrogen atom or an alkyl group, m is a natural number selected from usually 1 to 30, preferably 1 to 15, particularly preferably 1 to 10; and the like metal-containing group. Among them, —CH$_2$OCH$_2$—, and hydrocarbon chain having from 1 to 10 carbon atoms are preferred from the viewpoint of stability in production and usage. Hydrocarbon chain having from 1 to 6 carbon atoms, especially one carbon atom is particularly preferred.

The most preferable structure of 1,2-diol structural unit represented by the formula (1) is a structure where all $R^1$ to $R^6$ are hydrogen atoms and X is single bond, that is the structural unit of the formula (Ia) below.

[Formula 1a]

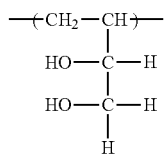

In the case of containing 1,2-diol structural unit of the formula (1), the content of the structural unit is in the range of usually 0.1 to 20 mol %, preferably 0.1 to 15 mol %, particularly 0.1 to 10 mol %.

(2) Production of Pellet

The above-mentioned EVOH resin may be formed into pellet by a conventionally known method. Examples of the method include a) hot-cut pelletizing process and b) strand-cut pelletizing process. The hot-cut pelletizing process is conducted by extruding molten EVOH resin from the outlet and cutting the extrudate, followed by cooling and solidified. The strand cut pelletizing process is conducted by extruding water-containing EVOH resin composition (such as solution or slurry containing EVOH resin) into a coagulating bath to obtain EVOH resin strand and cutting the strand.

As for the raw material of the pellet in either process a) or b), employed may be (i) EVOH resin solution or slurry which is directly obtained in the production of EVOH resin, or water-containing EVOH resin composition which is obtained by appropriately adjusting water content of the said EVOH resin solution or slurry; or (ii) EVOH resin melt obtained by melting EVOH resin pellet (dry pellet).

In the case of employing the water-containing EVOH resin composition as raw material to be fed to an extruder, the composition employs a solvent chosen from alcohol and a mixture of water and alcohol, preferably a mixture of water and alcohol. A preferable mixture of water and alcohol has a weight ratio of water to alcohol, i.e. water/alcohol is from 80/20 to 5/95. A preferable water-containing EVOH resin composition comprises 0 to 10 parts by weight of alcohol and 10 to 500 parts by weight of water, both based on 100 parts by weight of EVOH resin.

A method of adjusting water content of water-containing EVOH resin composition used for the production of pellets is not limited. In the case of increasing the water content, spraying water into resin, immersing resin in water, allowing resin to contact vaporized water or the like operation may be carried out. In the case of decreasing the water content, appropriately drying, for example with use of hot air ventilation dryer or hot air fluidized bed dryer, may be carried out.

a) Hot-Cut Pelletizing Process

In the case of feeding water-containing EVOH resin composition to an extruder as a raw material for pellet, the temperature of water-containing EVOH resin composition in the extruder is preferably set within the range of 70 to 170° C., particularly 80° C. or more, further particularly 90° C. or more but 170° C. or less. If the temperature of water-containing EVOH resin composition is unduly low, EVOH resin would not be completely molten. If the temperature of water-containing EVOH resin composition is unduly high, EVOH resin would be deteriorated due to heat. The temperature of resin composition in extruder is herein determined as a temperature measured nearby the outlet of extruder head with a temperature sensor placed at the extruder cylinder.

The extrudate of the water-containing EVOH resin composition through dice is cut before the molten EVOH resin is cooled and solidified. This is called hot-cut pelletizing process, which is classified into air hot-cut pelletizing where molten resin is cut in the air, and underwater pelletizing where molten resin is extruded into a bath filled with cooling liquid and equipped with cutter and is cut underwater. Either pelletizing process may be employed.

The temperature of the cooling liquid in the underwater pelletizing operation is such a temperature that the extrudate of EVOH resin melt does not solidify instantly in the coagulating bath. In the case of containing the EVOH resin with cooling liquid before cutting, the cooling liquid is preferably set at a temperature within the range of −20 to 50° C., more preferably −5 to 30° C.

The extrudate derived from dry EVOH resin pellet may be solidified more readily than that derived from water-containing EVOH resin composition in the underwater cut pelletizing operation. Therefore the temperature of cooling liquid in the former case should be set at a higher temperature than that in the latter case, commonly set at a temperature of 30 to 90° C., preferably 40 to 80° C., more preferably 20 to 70° C.

Liquid other than water may be used for cooling. Examples of the liquid include a mixture of water and alcohol; aromatic hydrocarbons such as benzene; ketones such as acetone and methyl ethyl ketone; ethers such as dipropyl ether; organic esters such as methyl acetate, ethyl acetate, methyl propionate and so on. Of these, water or a mixture of water and alcohol may be used because of handleability. As for the mixture, a weight ratio of water to alcohol is usually from 90/10 to 99/1. Lower alcohol such as methanol, ethanol, or propanol may be used for the alcohol, and methanol is preferably used in industries.

b) Strand-Cut Pelletizing Process

As is the case with the hot-cut pelletizing process, water-containing EVOH resin composition and molten EVOH resin may be employed for a raw material used in strand cut pelletizing process.

In the strand-cut pelletizing process, water-containing EVOH resin composition having a temperature of usually 10 to 100° C. may be extruded in a cooling chamber. The cooling chamber may be set at a temperature capable of cooling and solidifying the EVOH resin melt, i.e. within the range of usually −10 to 40° C. The EVOH resin melt may commonly stay in the coagulating bath for 10 to 400 seconds.

Thus produced pellet may have a shape such as column, sphere, disc, cube, cuboid, indefinite shape and so on, depending on the production process thereof.

Size and shape of the pellet may be controlled by adjusting bore of nozzle of the extruder used for the production, number and rotation speed of blades of cutter used for pelletizing operation.

When it comes to the size of pellet, a typical cylindrical pellet is from 1 to 10 mm, preferably 2 to 7 mm in diameter of the bottom surface, and 1 to 10 mm, preferably 3 to 8 mm in length, and a typical spherical pellet is from 1 to 10 mm, preferably 2 to 7 mm in diameter.

Among EVOH resin pellets mentioned above, a porous pellet is preferably used for the efficiency of the operation for permitting boron compound to be contained in the pellet. A preferable porous EVOH resin pellet has a water content of 20 to 80 wt % because such porous pellet would take in boron compound evenly and rapidly by a treatment for permitting boron compound to be contained in the pellet.

Such porous EVOH resin pellet may be produced by employing water-containing EVOH resin composition for a raw material of the pellet, and appropriately adjusting the concentration of EVOH resin in the water-containing EVOH resin composition, solvent type, temperature of the water-containing EVOH resin composition as an extrudate, temperature of coagulating bath, residence time in the coagulating bath and so on.

[Boron Compound]

The boron compound to be contained in EVOH resin pellet include boric acid or a metal salt thereof. Examples of the metal salt include calcium borate, cobalt borate, zinc borate (e.g. zinc tetraborate, zinc metaborate), potassium aluminum borate, ammonium borate (e.g. ammonium metaborate, ammonium tetraborate, ammonium pentaborate, ammonium octaborate), cadmium borate (e.g. cadmium orthoborate, cadmium tetraborate), potassium borate (e.g. potassium metaborate, potassium tetraborate, potassium pentaborate, potassium hexaborate, potassium octaborate), silver borate (e.g. silver metaborate, silver tetraborate), copper borate (e.g. copper (II) borate, copper metaborate, copper tetraborate), sodium borate (e.g. sodium metaborate, sodium diborate, sodium tetraborate, sodium pentaborate, sodium hexaborate, sodium octaborate), lead borate (e.g. lead metaborate, lead hexaborate), nickel borate (e.g. nickel orthoborate, nickel diborate, nickel tetraborate, nickel octaborate), barium borate (e.g. barium orthoborate, barium metaborate, barium diborate, barium tetraborate), bismuth borate, magnesium borate (e.g. magnesium orthoborate, magnesium diborate, magnesium metaborate, trimagnesium tetraborate, pentamagnesium tetraborate), manganese borate (e.g. manganese (I) borate, manganese metaborate, manganese tetraborate), and lithium borate (e.g. lithium metaborate, lithium tetraborate, lithium pentaborate). Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

[Boron-Containing EVOH Resin Pellet]

An EVOH resin pellet used in the disclosure contains a boron compound listed above in addition to EVOH resin. The pellet is sometimes called as "boron-containing EVOH resin pellet". The boron-containing EVOH resin has a specific amount of the boron compound contained in a surface portion of the pellet. Such boron-containing EVOH resin pellet is produced by conducting processes of (1) preparing a boron-containing EVOH resin pellet and (2) rinsing the boron-containing EVOH resin pellet.

Hereinafter, the EVOH resin pellet obtained by the process (1) is called as "boron-containing EVOH resin pellet (prior to rinsing)" for distinguishing from the EVOH resin pellet obtained by the rinsing process (2), which is called as "boron amount-adjusted EVOH resin pellet".

(1) Process for Permitting Boron Compound to be Contained in Pellet (Contacting Process)

The process for preparing boron-containing EVOH resin pellet (prior to rinsing), corresponding to the process of permitting boron compound to be contained in pellet, is carried out by contacting the EVOH resin pellet with boron compound.

Contacting EVOH resin pellet with boron compound may be conducted i) in the production of the EVOH resin pellets or ii) after the production of the pellets.

The process i) may be carried out, for example, by adding boron compound to a raw material for EVOH resin pellet, or by employing boron compound-containing aqueous solution for cooling liquid in a coagulation bath. The raw material is water-containing EVOH resin composition or EVOH resin melt.

In the case that water-containing EVOH resin composition is used for the raw material, boron compound may be added to the water-containing EVOH resin composition. In the case that EVOH resin melt obtained by melting a dry EVOH resin pellet is used for the raw material, boron compound may be added to the dry EVOH resin.

A preferable method comprises extruding water-containing EVOH resin composition containing boron compound in a strand into a coagulation bath, and cutting the strand-shaped extrudate.

The process ii) may be carried out by spraying an aqueous solution of boron compound against EVOH resin pellet; dipping EVOH resin pellet into aqueous solution of boron compound; feeding EVOH resin pellet under agitating aqueous solution of boron compound; and so on. Of these, the method of feeding EVOH resin pellet under agitating aqueous solution of boron compound is preferably employed because the boron compound may intrude into the inside of pellet effectively.

Of these processes for contacting boron compound, the process ii) is preferred from the viewpoint of general versatility because of being applicable to a variety of pellets. The process of contacting a porous EVOH resin pellet with aqueous solution of boron compound is more preferred.

In the process for permitting boron compound to be contained in pellet, i.e. contacting process, the aqueous solution of boron compound having a concentration of usually 0.001% to 1%, preferably 0.003 to 0.5% is used. When the concentration is unduly low, it would be difficult for the pellet to contain a boron compound up to an intended amount. When the concentration is unduly high, the appearance of a final molded article would be impaired.

The EVOH resin pellet thus obtained after the contacting process, so-called boron-containing EVOH resin pellet (prior to rinsing), has a concentration of boron compound in the range of usually 10 to 10000 ppm, preferably 20 to 5000 ppm, more preferably 30 to 3000 ppm, in terms of boron. The concentration corresponds to a total amount of boron compound in pellet. Unduly low concentration would give an insufficient effect of addition of boron compound. Unduly high concentration would impair the appearance of the resulting molded article.

The total content of boron compound may be controlled in the contacting process with aqueous solution of boron compound by appropriately choosing a concentration of boron compound of the solution, contacting time, temperature when contacting, agitation speed, water amount contained in EVOH resin pellet which contacts with the aqueous solution, or the like.

The amount of boron compound contained in boron-containing EVOH resin pellet (prior to rinsing), which is a total amount of boron compound in terms of boron, is determined by measuring a sample solution described below with ICP emission analysis (ICP-AES). The sample solution is prepared by decomposing pellet together with concentrated nitric acid with microwave decomposition to obtain a solution, followed by adjusting to a predetermined volume by adding water.

After the contacting process with boron compound, pellet is preferably dried. Drying operation may be performed by a known method, for example, a flow drying system with use of cylinder/channel type mixing dryer, cylindrical dryer, rotary dryer, fluidized bed dryer, vibration fluidized bed dryer, or cone rotary dryer; or a static drying system with use of batch box type dryer, band dryer, tunnel dryer, or vertical silo dryer. Blowing gas such as nitrogen gas having a temperature of 80 to 150° C. into a dryer can improve efficiency of drying operation without adverse effect on boron-containing EVOH resin pellet (prior to rinsing).

(2) Process for Adjusting Boron Content (Rinsing Process)

The process for adjusting the amount of boron compound contained in a surface portion of the boron-containing EVOH resin pellet (prior to rinsing) produced above may be conducted by rinsing the boron-containing EVOH resin pellet (prior to rinsing). Such rinsing operation is sometimes called "boron amount adjusting process" or "rinsing process". The rinsing operation is depended on the total amount of the boron compound contained in the boron-containing EVOH resin pellet (prior to rinsing) to be adjusted, and the amount of the boron compound contained in a surface portion of the pellet.

A preferable rinsing process may be carried out by contacting the pellet with a liquid for rinsing such as alcohol, and a mixture of water and alcohol (so-called water/alcohol mixed solution). A preferable liquid for rinsing is alcohol or the mixture, and more preferable liquid for rinsing is the mixture.

Examples of the alcohol include alcohol having from 1 to 8 carbon atoms, preferably 1 to 5 carbon atoms, more preferably 1 to 3 carbon atoms, such as methanol, ethanol, 1-propanol, 2-propanol, 1-butanol, 2-methyl-1-propanol, 2-butanol, and 2-methyl-2-propanol. Of these, methanol is particularly preferred because of commercial availability and a reasonable cost.

As for the water/alcohol mixed solution used as the rinsing liquid, the weight ratio of water to alcohol, i.e. water/alcohol, is in the range of 80/20 to 0/100, preferably 65/35 to 15/85, more preferably 50/50 to 20/80. Unduly high content of either water or alcohol would not provide a sufficient effect of decreasing boron amount contained in a surface portion of the pellet. Therefor the water/alcohol mixed solution having the above-mentioned range of the ratio is preferably used. In general, the solubility of alcohol in water is higher than that of boron compound. Taking into consideration the fact, it is surprised that the elution amount of boron compound from boron-containing EVOH resin pellet rinsed with water/alcohol mixed solution is higher than that rinsed with alcohol alone. The solubility of the boron compound in 10 g of water at 23° C. is from about 0.1 to about 10%, and that in 10 g of methanol at 23° C. is from about 15 to about 30%.

The rinsing operation is carried out by contacting the pellet with rinsing liquid. Contacting with the rinsing liquid is carried out by, for example, immersing in a rinsing liquid under agitation, circulating pellets in the rinsing liquid, spraying to the pellet with the rinsing liquid, or the combination thereof. In immersing operation, addition of vibrating with ultrasonic wave is effective for the rinsing. In industry practice, immersing in the rinsing liquid under agitation and circulating pellets in the rinsing liquid are preferably employed.

A preferable period of contacting with rinsing liquid is from 5 minutes to 48 hours, particularly 10 minutes to 24 hours. A preferable temperature of the rinsing liquid is from 10 to 80° C., particularly 20 to 60° C.

After the rinsing process, the pellet is preferably dried. In particular, the pellet may be preferably dried until the content rate of water is reduced to the range of about 0.01 to about 1%, preferably about 0.05 to about 0.5%. The same manner as drying for boron-containing EVOH resin pellet (prior to rinsing) may be employed for the pellet after the rinsing process.

Thus rinsing process can provide a pellet having a reduced amount of the boron compound in the surface portion. In the EVOH resin pellet after boron amount-adjusting process, which is called boron amount-adjusted pellet, has a total amount of boron compound is in the range of preferably 10 to 1000 ppm, more preferably 20 to 500 ppm, further more preferably 50 to 300 ppm, in terms of boron per EVOH resin pellet.

Unduly low amount of boron tends to decrease melt viscosity of the pellet, resulting in impairing the film formability. In particular, forming film through blowing inflation air tends to become difficult. Accordingly, it is preferred to adjust the amount of boron at least 10 ppm to the extent.

The amount of boron contained in a surface portion of the pellet after the rinsing process is in the range of 1.7 ppm or less, preferably 1.6 ppm or less, more preferably 1.5 ppm or less, particularly preferably 1.2 ppm or less, per boron-containing EVOH resin pellet. The lower limit of the amount is not particularly limited, however, in the case that the pellet has an above-mentioned range of total amount of boron, the lower limit is commonly 1 ppb or more, preferably 50 ppb or more, more preferably 100 ppb or more.

Unduly high amount of boron contained in the surface portion may cause the occurrence of fish eye, which impairs the film appearance and film formability.

The amount of boron contained in a surface portion of the pellet after rinsing process is determined by measuring a sample methanol solution with Inductively Coupled Plasma-Mass Spectrometer (ICP-MS). The sample methanol solution is prepared by immersing 4 g of boron-containing EVOH resin pellet in 20 ml of methanol at 30° C. for 6 hours.

EVOH resin pellet after rinsing process (boron amount-adjusted pellet) has a boron contained in the surface portion relative to the total amount of boron compound in the pellet, i.e. the weight ratio of amount of boron in the surface portion/total amount of boron, $1.38 \times 10^{-2}$ or less, more preferably $1.35 \times 10^{-2}$ or less, further more preferably $1.30 \times 10^{-2}$ or less, yet further more preferably $1.1 \times 10^{-2}$ or less, particularly preferably $1.00 \times 10^{-2}$. When the ratio is unduly high, fish eye is readily to occur, which would impair film appearance. The lower limit is usually $1.0 \times 10^{-7}$.

[Other Ingredient]

EVOH resin pellets of the disclosure may comprise other kinds of EVOH resin pellets in addition to the pellet mentioned above. The other kinds of pellets include a pellet differing in the content rate of 1,2-diol structural unit represented by the general formula (1), pellet differing in the content rate of ethylene-derived unit, pellet having a different saponification degree, pellet having a different melt flow rate (MFR), pellet containing a different structural unit derived from other comonomer, and so on.

The EVOH resin pellet may contain an additive conventionally used for EVOH resin within the range of not inhibiting the effect of the disclosure. Examples of the additive include heat stabilizer, antioxidant, antistatic agent, colorant, ultraviolet absorber, lubricant, plasticizer, light stabilizer, surfactant, insecticide, drying agent, antiblocking agent, fire retardant, crosslinking agent, curing agent, foaming agent, crystal forming agent, anti-fogging agent, biodegradable agent, silane coupling agent, oxygen scavenger, and so on.

The heat stabilizer may be added for the purpose of improving various properties such as thermostability during melt-molding and includes organic acid such as acetic acid, propionic acid, butyric acid, lauric acid, stearic acid, oleic acid, or behenic acid, and its alkaline metal (e.g. sodium and potassium) salt, alkaline earth metal (e.g. calcium and magnesium) salt, zinc salt or the like salt; inorganic acids such as sulfuric acid, sulfurous acid, carbonic acid, phosphoric acid, or boric acid, or its alkaline metal (e.g. sodium and potassium) salt, alkaline earth metal (e.g. calcium and magnesium) salt, zinc salt, or the like salt. Of these, preferred are acetic acid, boron compound including boric acid and its salt, acetate, and phosphate.

Addition of the ingredient may be commonly carried out prior to the contacting operation with aqueous solution of boron compound, at the same time as the contacting operation, or after the contacting operation, which are the operation for allowing the ingredient to be contained into the pellet. It is preferred that the addition is carried out at the same time as the contacting operation.

Other ingredients may be commonly added by contacting the EVOH resin pellet with a solution containing the ingredients, but not limited to this operation. Accordingly, in the case of prior to the contacting operation with a boron compound, either impregnation of EVOH resin pellet into an aqueous solution of the additive or employment of a solution containing the additive as well as the boron compound may be conducted, thereby achieving the addition of the ingredient to the EVOH resin.

A molding material of EVOH resin pellets thus produced is excellent in melt-molding property and film appearance. In particular, the EVOH resin pellets can be formed into a monolayer film having an excellent appearance almost without fish eye.

[Melt-Molded Article]

The EVOH resin pellets comprising the boron amount-adjusted EVOH resin pellets may be formed into film, sheet, cup or bottle by melt-molding. The melt-molding method includes extrusion molding (T-die extrusion, blown film extrusion, blow molding, melt spinning, contour extrusion etc.), injection molding and the like. The melt-molding temperature is selected from the range of usually 150 to 300° C.

A melt-molded article made from the resin pellets of the invention may be directly used in a variety of applications. The EVOH resin pellets of the invention can provide a melt-molded article having a superior appearance, in particular, an EVOH resin film with suppression of the occurrence of fish eye even in the case of a monolayer film of EVOH resin. The EVOH resin layer (or EVOH resin film) commonly has a thickness of 1 to 5000 μm, preferably 5 to 4000 μm, particularly preferably 10 to 3000 μm.

The film including a monolayer film made from the pellet of boron-containing EVOH resin is excellent in moldability and appearance. Also included is a multilayer structure in which another resin layer is layered on the film according to needs such as water resistance or strength.

Thus produced film, sheet, stretched film, and container made from a stretched film such as bag, cup, tray, tube, bottle, and cover are useful for various wrapping material or container for general food as well as condiment such as mayonnaise, dressing, fermented food such as miso, oil and fat food such as salad oil, beverages, cosmetics, pharmaceutical preparations, and the like.

Example

The invention will be specifically explained with examples below, but these examples do not restrict the invention as long as it does not exceed the gist of the invention.

The term "parts" in Examples is on the basis weight unless otherwise indicated.

[Measurement and Evaluation Methods]

(1) Total Amount of Boron in EVOH Resin Pellet

A sample solution was prepared by breaking down 0.1 g of EVOH resin pellets in concentrated nitric acid with microwave, and diluting the resulting solution with pure water for adjusting the concentration of 0.75 mg/ml. The boron amount contained in the prepared solution was measured with use of ICP emission spectrochemical analysis (ICP-AES) (analyzer: 720-ES type from Agilent Technologies). The boron amount as a measurement value corresponds to the amount of boron derived from the boron compound used.

(2) Amount of Boron Contained in a Surface Portion of EVOH Resin Pellet

A sample solution was a methanol solution prepared by immersing, in 20 ml of methanol (30° C.) for 6 hours, 4 g of EVOH resin pellet after rinsing operation. The amount of boron contained in a surface portion of EVOH resin pellet was determined by measuring the amount of the prepared sample solution by Inductively Coupled Plasma-Mass Spectrometer (ICP-MS) (apparatus: ELAN DRCII from PerkinElmer Co., Ltd.). The boron amount as a measurement value corresponds to the amount of boron derived from the boron compound used.

(3) Water Content Rate of Pellet (%)

The content rate of volatile matter was employed as the water content rate of pellet. The content rate of the volatile matter was calculated using weight of EVOH resin pellet before drying (W before drying) and weight of EVOH resin pellet after drying at 150° C. for 5 hours (W after drying) as shown below.

volatile matter content rate (%)={($W$ before drying−$W$ after drying)/($W$ before drying)}×100

(4) Fish Eye

For evaluation concerning fish eyes, a monolayer film (10 cm in length and 10 cm in width) having a thickness of 30 μm was examined with a digital defect inspection machine (GX-70LT from Mamiya-OP Co. Ltd.).

The measurement value is number of fish eyes, which is counted by lighting the monolayer film from the downside and counting the portions which the light does not pass through per 100 cm$^2$. The size of the portion is from 0.1 to 0.2 mm in diameter.

The reading speed of examination for counting is 3 m/min.

[Production of EVOH Resin Pellet]

EVOH Resin Pellet No. 1:

EVOH resin having 44 mol % in ethylene-derived unit content, 99.6 mol % in saponification degree, and 3.8 g/10 minutes of MFR (210° C., load of 2160 g) was employed. The EVOH resin was dissolved in a mixture of water and methanol (weight ratio of water to methanol being 20/80) to obtain a solution having EVOH resin concentration of 40%. The solution having a temperature of 60° C. was extruded in strand into a water bath set at 5° C. to be solidified, followed by cutting operation, thereby obtaining cylindrical pellets. The cylindrical pellet has 4 mm in diameter and 4 mm in length. The pellets were thrown into warm water (30° C.) and then mixed for about 4 hours. The product pellet of EVOH resin has a water content rate of 50%.

100 parts of the porous EVOH resin pellets were thrown into 200 parts of boric acid aqueous solution (0.08%) and agitated at 30° C. for 5 hours. Thereafter the porous boron-containing EVOH resin pellets (prior to rinsing) were retrieved.

The boron-containing EVOH resin pellets (prior to rinsing) were dried in a batch system tower type fluidized bed dryer with blowing nitrogen gas (75° C.) for 3 hours. Thus obtained dried pellets had a water content rate of 20%. Next further drying was conducted by placing in a batch system box type ventilation dryer with blowing nitrogen gas (125° C.) for 18 hours. Thus obtained dried pellets had a water content rate of 0.3% per pellets. Thus obtained boron-containing EVOH resin pellets (prior to rinsing) were measured with respect to a total amount of boron according to the above-mentioned method. The measurement value was 130 ppm.

Thus obtained boron-containing EVOH resin pellet (water content rate: 0.3%, total boron amount: 130 ppm) was served for the rinsing operation below.

5 parts of the boron-containing EVOH resin pellets (prior to rinsing) and 10 parts of the mixture of water and methanol (weight ratio of water/methanol=3/7) as a liquid for adjusting boron amount were put into a stainless container and agitated at 35° C. for 1 hour. Thereafter, the pellets were retrieved and dried at 120° C. for 16 hours under nitrogen flow. The product EVOH resin pellet has an intended boron amount, which was a boron amount-adjusted pellet.

The boron amount-adjusted EVOH resin pellet was measured with respect to total amount of boron and amount of boron contained in a surface portion of the pellet according to the above-mentioned method. The total amount of boron was 128.8 ppm, the amount of boron contained in the surface portion was 1.1 ppm, and the volatile matter content rate was 0.13% by weight.

The boron amount-adjusted EVOH resin pellet was fed into a single layer T-die cast film extruder to form into a monolayer film having a thickness of 30 μm. The extruder was set at 230° C. as a highest temperature and 40 rpm in screw rotational frequency. The number of fish eyes in the resulting film was determined according to the above-mentioned method.

EVOH Resin Pellet Nos. 2 and 3:

The rinsing treatment was conducted in the same manner as No. 1 except that the composition of the rinsing liquid was changed as shown in Table 1. The produced boron amount-adjusted EVOH resin pellet was measured with respect to total amount of boron and amount of boron contained in a surface portion of the pellet.

Thereafter, the boron amount-adjusted EVOH resin pellet was formed into monolayer film in the same manner as No. 1. Thus obtained film was evaluated with respect to the occurrence of fish eye. The results were shown in Table 1.

EVOH Resin Pellet No. 4:

The EVOH resin pellet containing boron (prior to rinsing) which was not served to rinsing operations was fed to a single layer T-die cast film extruder, which was set at 230° C. as the highest temperature and 40 rpm in screw rotational frequency, to form into a monolayer film having a thickness of 30 μm. The number of fish eyes in the resulting monolayer film was determined according to the above-mentioned method. The evaluation result was shown in Table 1.

and alcohol was larger than that with alcohol. Table 1 showed that the pellet having 1.7 ppm or less of the boron contained in the surface portion could significantly suppress the occurrence of fish eye.

INDUSTRIAL APPLICABILITY

The EVOH resin pellets of the invention, which have a reduced amount of boron compound contained in a surface portion of the pellet, can provide a film excellent in appearance without impairing moldability. Accordingly EVOH resin pellet is more widely applied to the field where the appearance of wrapping material is strictly required than a conventional EVOH resin pellet.

The invention claimed is:

1. A pellet, comprising: a saponified ethylene-vinyl ester-based copolymer pellet; and a boron compound; wherein a surface portion of the pellet contains 1.7 ppm or less of boron; wherein a total amount of boron in the pellet is 10 to 1000 ppm.

2. The pellet according to claim 1, wherein a weight ratio of the boron contained in the surface portion of the pellet to a total amount of boron in the pellet is $1.38 \times 10^{-2}$ or less.

3. The pellet according to claim 1, further comprising water in an amount of 0.01 to 1 wt % based on a total weight of the pellet.

4. A plurality of pellets, comprising at least one pellet according to claim 1.

5. A plurality of saponified ethylene-vinyl ester-based copolymer pellets, comprising at least one pellet according to claim 1.

6. A method for producing the pellet according to claim 1, comprising:

contacting a pellet comprising a saponified ethylene-vinyl ester-based copolymer and a boron compound with a mixture of water and alcohol having a ratio of water to alcohol of 80/20 to 0/100, until an amount of the boron compound in a surface portion of the pellet is 1.7 ppm or less.

TABLE 1

|  |  | pellet No. | | | |
| --- | --- | --- | --- | --- | --- |
|  |  | 1 | 2 | 3 | 4 |
| rinsing process | rinsing liquid (weight ratio) | water/methanol (3/7) | methanol | water | — |
| pellet | water content rate (wt %) | 0.13 | 0.13 | 0.13 | 0.09 |
|  | boron amount (ppm) surface portion | 1.1 | 1.3 | 1.8 | 2.3 |
|  | total amount | 128.8 | 129.0 | 129.5 | 130 |
|  | surface portion/ total amount | $0.85 \times 10^{-2}$ | $1.01 \times 10^{-2}$ | $1.39 \times 10^{-2}$ | $1.77 \times 10^{-2}$ |
| evaluation | fish eye (count/100 cm²) | 3 | 6 | 17 | 25 |

From the comparison between pellets No. 4 and Nos. 1 to 3, it is understood that the rinsing process could reduce the amount of boron contained in a surface portion of the pellet. The reduced amount of the boron contained in the surface portion by the rinsing operation with alcohol is larger than that with water, and furthermore that with a mixture of water 7. The method according to claim 6, further comprising drying the pellet after contacting it with the mixture of water and alcohol;

wherein the pellet is a porous pellet.

* * * * *